United States Patent
Miyahara

(10) Patent No.: US 11,126,155 B2
(45) Date of Patent: Sep. 21, 2021

(54) AUTOMATIC SCREW INSPECTION SYSTEM

(71) Applicant: FANUC CORPORATION, Yamanashi (JP)

(72) Inventor: Yuuya Miyahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 86 days.

(21) Appl. No.: 16/700,922

(22) Filed: Dec. 2, 2019

(65) Prior Publication Data

US 2020/0174443 A1 Jun. 4, 2020

(30) Foreign Application Priority Data

Dec. 4, 2018 (JP) .............................. JP2018-227338

(51) Int. Cl.
*G05B 19/401* (2006.01)

(52) U.S. Cl.
CPC .. *G05B 19/401* (2013.01); *G05B 2219/49196* (2013.01)

(58) Field of Classification Search
CPC .......... G05B 2219/49196; G05B 19/04; G01B 11/2425; G01B 3/48
See application file for complete search history.

(56) References Cited

U.S. PATENT DOCUMENTS

2007/0002315 A1* 1/2007 Ban ..................... G01B 11/2425
356/237.1
2008/0304085 A1* 12/2008 Mead .................... G01B 11/22
356/626

(Continued)

FOREIGN PATENT DOCUMENTS

EP         3409427 A1 * 12/2018  ........... G05B 19/401
JP        S60-161541 A     8/1985
(Continued)

OTHER PUBLICATIONS

An Office Action; "Notice of Reasons for Refusal", mailed by the Japanese Patent Office dated Feb. 16, 2021, which corresponds to Japanese Patent Application No. 2018-227338 and is related to U.S. Appl. No. 16/700,922; with English language translation.

*Primary Examiner* — Ronald D Hartman, Jr.
(74) *Attorney, Agent, or Firm* — Studebaker & Brackett PC

(57) ABSTRACT

To provide an automatic screw inspection system allowing screw inspection of a workpiece to be conducted more efficiently. An automatic screw inspection system comprises: a robot to which a screw inspection device is attached, the screw inspection device including a holder unit attached in a removable manner and holding an inspection gauge used for inspection of a female screw hole in a workpiece as an inspection target; a gauge storage storing a plurality of the holder units for inspection of the female screw hole conforming to a plurality of standards; a table on which the workpiece is to be placed; and a controller that controls the drive of the robot. The controller comprises: a holder unit attachment/storage control unit that controls the drive of the robot and the screw inspection device so as to select the holder unit conforming to a standard for the female screw hole from the gauge storage and attach the selected holder unit automatically to the screw inspection device; and an inspection implementation control unit that controls the drive of the robot and the screw inspection device so as to make the screw inspection device inspect the female screw hole in the workpiece.

5 Claims, 8 Drawing Sheets

(56) References Cited

U.S. PATENT DOCUMENTS

| | | | |
|---|---|---|---|
| 2015/0159998 A1* | 6/2015 | Altendorf | G01B 11/005 |
| | | | 356/635 |
| 2016/0274576 A1* | 9/2016 | Fujiyama | G05B 19/401 |
| 2018/0281186 A1* | 10/2018 | Hiraide | B25J 13/085 |
| 2019/0271536 A1* | 9/2019 | Haas | G01B 11/12 |

FOREIGN PATENT DOCUMENTS

| | | |
|---|---|---|
| JP | H04-240539 A | 8/1992 |
| JP | H09-280854 A | 10/1997 |
| JP | 2007-256087 A | 10/2007 |
| JP | 2013-072700 A | 4/2013 |

* cited by examiner

FIG. 7

| DATE AND TIME | MACHINE NUMBER | M4 GO (1) | M4 NO-GO | M6 GO (1) | M6 NO-GO | M8A GO (2) | M8A NO-GO | M8B GO (3) | M8B NO-GO |
|---|---|---|---|---|---|---|---|---|---|
| ***** | ***** | 1 | 1 | 1 | 1 | 1 | 1 | 1 | 1 |
| ***** | ***** | 1 | 1 | 1 | 1 | 1 | 1 | 1 | 1 |
| ***** | ***** | 1 | 1 | 1 | 1 | 1 | 1 | 1 | 1 |
| ***** | ***** | 1 | 1 | 0 | 1 | 1 | 1 | 1 | 1 |
| ***** | ***** | 1 | 1 | 1 | 1 | 1 | 1 | 1 | 1 |
| | | | | | | | | | |
| ... | | | | | | | | | |

AUTOMATIC SCREW INSPECTION SYSTEM

This application is based on and claims the benefit of priority from Japanese Patent Application No. 2018-227338, filed on 4 Dec. 2018, the content of which is incorporated herein by reference.

BACKGROUND OF THE INVENTION

Field of the Invention

The present invention relates to an automatic screw inspection system.

Related Art

In a conventional machining and manufacturing field, a workpiece machined by a machine tool, for example, is managed as follows. The workpiece is cleaned, subjected to inspection such as appearance inspection, size inspection, or screw inspection to determine the presence or absence of a defective part, the defective part is removed, a cause and others for machining resulting in the defective part are identified, and improvement is made to prevent the occurrence of the machining resulting in the defective part.

In the appearance inspection, visual inspection is conducted for a flaw, a residual flash, or dirt, for example. In the size inspection, the size of each unit of the workpiece is measured using a micrometer, for example.

In the screw inspection, a check is performed to see whether a female screw hole or a pin hole formed in the workpiece is formed into a predetermined depth or a diameter, for example, by using a screw gauge or a pin gauge in the female screw hole or the pin hole.

Patent document 1 discloses inspection equipment as a screw inspection device that inspects a screw part in a work (workpiece), including: a work receiving jig that holds the work so as to prevent rotation of the work; a screw gauge to be screwed into the screw part of the work held by the work receiving jig; a holder member provided to be movable in the axis direction of the work receiving jig and used for supporting the screw gauge; a torque controlled motor provided to the holder member and used for rotating the holder member at a specified torque and stopping the rotation in response to an application of torque larger than a predetermined value; and an encoder that measures a stroke length toward the axis direction of the screw gauge.

Patent document 2 discloses a device for inspection of a part (workpiece) with a screw as a screw inspection device, including: holding means that holds the part with the screw; floating supporting means that supports the holding means in a floating state of allowing the holding means to move freely by a minute distance in a direction at a right angle to the axis of the screw; biasing means that biases the holding means toward a center position; and a screw gauge having an inspection screw corresponding to the screw of the part and arranged in such a manner as to locate these screws at concentric positions facing each other. This screw inspection device is configured in such a manner that the screw gauge in a rotating state is driven forward to screw the inspection screw into the screw in the part.

Patent document 3 discloses a test device for a test of a screw part as a screw inspection device (test device for a screw part) including: a holding unit that holds a test piece to which a screw is threadedly engaged; and a power unit that rotates a driver used for tightening a screw capable of being threadedly engaged with the test piece fixed by the holding unit, and moves the driver up and down. The holding unit includes a placement table movable in an X-Y direction so as to allow the selection of at least a tapping position in the test piece in the X-Y direction. The power unit includes: a sliding part that moves the driver up and down; a supporting mechanism that allows adjustment of the direction of the driver freely on the sliding part; and a floating mechanism that supports the driver in a manner allowing the driver to make a floating motion freely on the supporting mechanism.

Patent Document 1: Japanese Unexamined Patent Application, Publication No. 2007-256087
Patent Document 2: Japanese Unexamined Patent Application, Publication No. H04-240539
Patent Document 3: Japanese Unexamined Patent Application, Publication No. S60-161541

SUMMARY OF THE INVENTION

Regarding screw inspection of a workpiece W generally conducted, a go gauge $1a$ (inspection gauge 1) is used to check whether the go gauge $1a$ reaches a designated depth in a female screw hole 2 by screwing in the go gauge $1a$ by hand without excessive force, as shown in FIG. 9. Further, a no-go gauge $1b$ (inspection gauge 1) is used to check whether screwing the no-go gauge $1b$ by hand without excessive force into the female screw hole 2 stops at a rotation of less than two turns, as shown in FIG. 10. In this way, the pass-fail of machining of the female screw hole is determined.

Hence, much effort and time have been required for an inspector to inspect by hand a large number of female screw holes formed in a workpiece. Further, the inspector has been required to be skilled for conducting an inspection. For this reason, making screw inspection of a workpiece more efficient has strongly been desired.

In this regard, using the screw inspection devices described in patent document 1, patent document 2, and patent document 3 eliminates the need for an inspector to conduct an inspection by hand, allowing screw inspection to be conducted even without a skilled inspector.

However, the screw inspection devices described in patent document 1, patent document 2, and patent document 3 are devices merely for inspecting a female screw hole in a workpiece or a test piece. Hence, for implementation of screw inspection in a production step in which workpieces are produced and fed in large quantity, for example, an inspector is required to perform a process of placing the workpieces one by one on a table and conducting the screw inspection of these workpieces repeatedly. In this regard, even if the screw inspection device described in patent document 1, patent document 2, or patent document 3 is used, it is still impossible to conduct screw inspection automatically, failing to achieve a sufficient degree of efficiency in the screw inspection.

In view of the foregoing circumstances, the present invention is intended to provide an automatic screw inspection system allowing screw inspection of a workpiece to be conducted more efficiently by encouraging automation of the screw inspection.

The present inventor has found means allowing screw inspection of a workpiece to be conducted more efficiently by encouraging automation of the screw inspection, thereby completing the present invention.

(1) The present invention is intended for an automatic screw inspection system (automatic screw inspection system A described later, for example) that inspects a female screw hole (female screw hole 2 described later, for example) formed in an inspection target (workpiece W described later, for example) automatically, comprising: a robot (robot 9 described later, for example) to which a screw inspection device (screw inspection device 11 described later, for example) is attached, the screw inspection device including a holder unit (holder unit 12 described later, for example) attached in a removable manner and holding an inspection gauge (inspection gauge 1, go gauge 1a, no-go gauge 1b described later, for example) used for inspection of the female screw hole in the inspection target; a gauge storage (gauge storage 13 described later, for example) storing a plurality of the holder units for inspection of the female screw hole conforming to a plurality of standards; a table (inspection table 7 described later, for example) on which the inspection target is to be placed; and a controller (controller 15 described later, for example) that controls the drive of the robot. The controller comprises: a holder unit attachment/storage control unit (holder unit attachment/storage control unit 16 described later, for example) that controls the drive of the robot and the screw inspection device so as to select the holder unit conforming to a standard for the female screw hole formed in the inspection target and to be subjected to inspection from the gauge storage and attach the selected holder unit automatically to the screw inspection device and/or to store the holder unit attached to the screw inspection device in a predetermined position in the gauge storage; and an inspection implementation control unit (inspection implementation control unit 17 described later, for example) that controls the drive of the robot and the screw inspection device so as to make the screw inspection device inspect the female screw hole in the inspection target on the table or in the inspection target retrieved from the table and held by the robot.

(2) According to the present invention, in the foregoing (1), the screw inspection device may be configured to determine the pass-fail of the female screw hole by detecting the torque applied for threadedly engaging the inspection gauge with the female screw hole.

(3) According to the present invention, in the foregoing (1) or (2), if a plurality of the female screw holes are formed using the same tool, the inspection implementation control unit may exert control so as to inspect only the female screw hole finally formed among the female screw holes formed using the same tool.

(4) According to the present invention, in the foregoing (3), if a plurality of the female screw holes are formed by exchanging tools conforming to the same standard, the inspection implementation control unit may exert control so as to inspect the female screw hole finally formed using each of the tools conforming to the same standard among the female screw holes formed using each of the tools conforming to the same standard.

The present invention achieves the automation of screw inspection to allow the screw inspection of a workpiece to be conducted considerably more efficiently compared to conventional inspection.

BRIEF DESCRIPTION OF THE DRAWINGS

FIG. 7 shows an example of a file of results of screw inspection conducted by using the automatic screw inspection system according to the embodiment of the present invention;

DETAILED DESCRIPTION OF THE INVENTION

An automatic screw inspection system according to an embodiment of the present invention will be described below with reference to FIGS. 1 to 8.

This embodiment relates to a system for conducting inspection automatically to check whether a female screw hole in a workpiece machined by a machine tool is formed into a predetermined specified shape.

As a specific example, a workpiece as an inspection target of screw inspection by the automatic screw inspection system is a workpiece machined by a machine tool, then placed on a pallet, transported into an uninspected part distribution warehouse of an automated warehouse by an automated guided vehicle (AGV), for example, and stored in a predetermined stacker rack (parcel rack) by a stacker crane provided in the uninspected part distribution warehouse.

Figure 1:
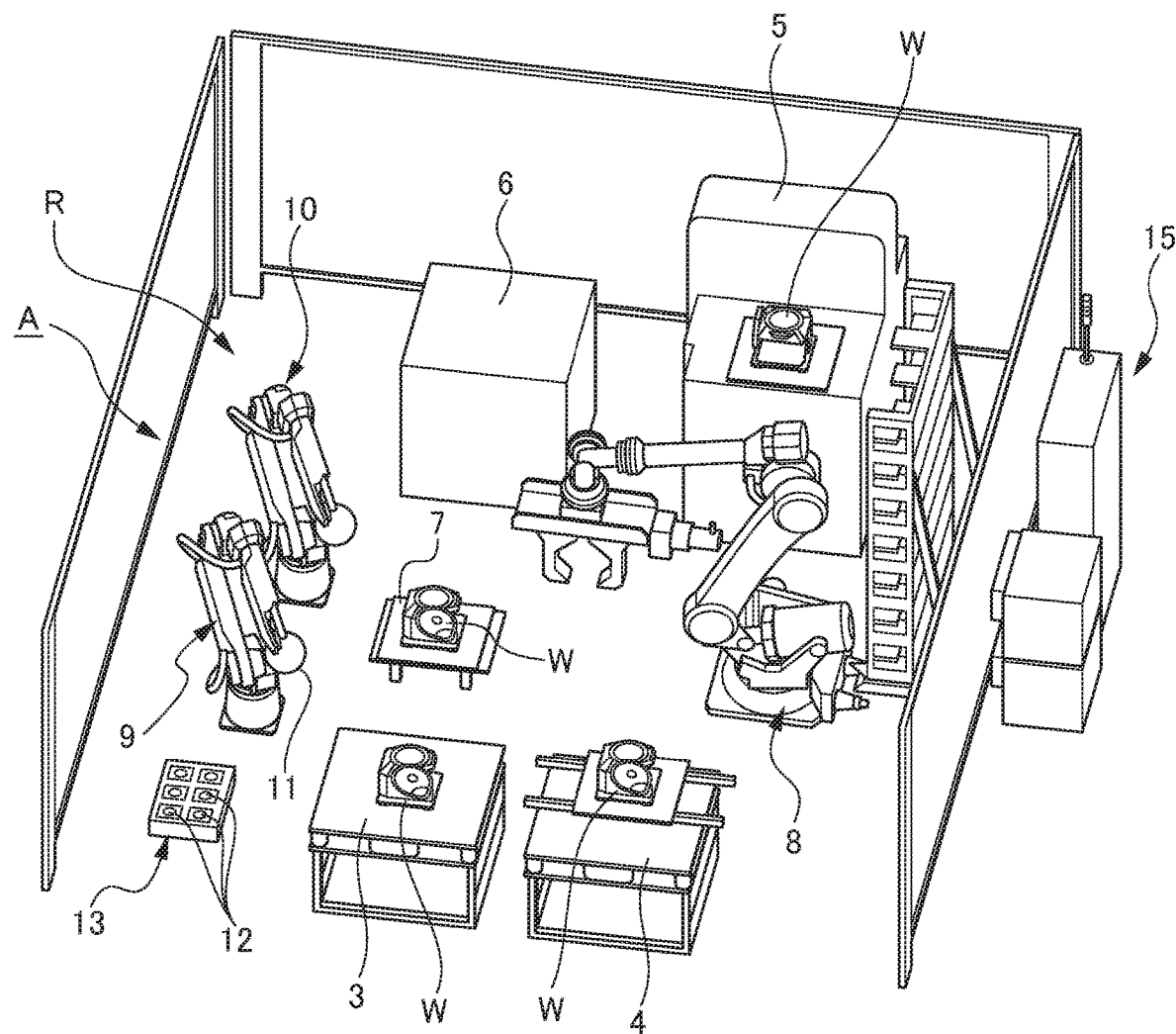
FIG. 1 is a perspective view showing an automatic screw inspection system according to an embodiment of the present invention.

As shown in FIG. 1, an automatic screw inspection system A of this embodiment is provided in a screw inspection region (a region for appearance inspection, etc.) R adjacent to the uninspected part distribution warehouse, for example.

The automatic screw inspection system A of this embodiment includes: a temporary placement table 3 and a temporary placement table 4 arranged at predetermined positions in the screw inspection region R; a cleaning unit 5 for cleaning the workpiece W; an air blow unit 6 for removing a cleaning fluid from the cleaned workpiece W; an inspection table 7 on which the cleaned workpiece W is to be placed; a handling robot 8 for transporting the workpiece W between the temporary placement table 3 or 4, the cleaning unit 5, the air blow unit 6, and the inspection table 7; and a screw inspection robot 9 for conducting screw inspection of the workpiece W transported to the inspection table 7.

In this embodiment, an appearance inspection region and the screw inspection region R are set in the same region. As shown in FIG. 1, an appearance inspection robot 10 for appearance inspection of the workpiece W by means of imaging inspection and the screw inspection robot 9 are arranged side by side. The screw inspection robot 9 and the appearance inspection robot 10 are configured to conduct respective inspections of the workpiece W transported to the inspection table 7.

The screw inspection robot 9 is formed as a robot with an articulated arm and has a tip portion configured to be movable freely within a predetermined range in all directions. A screw inspection device 11 such as that shown in FIG. 2 is attached to the tip portion of the screw inspection robot 9.

Figure 2:
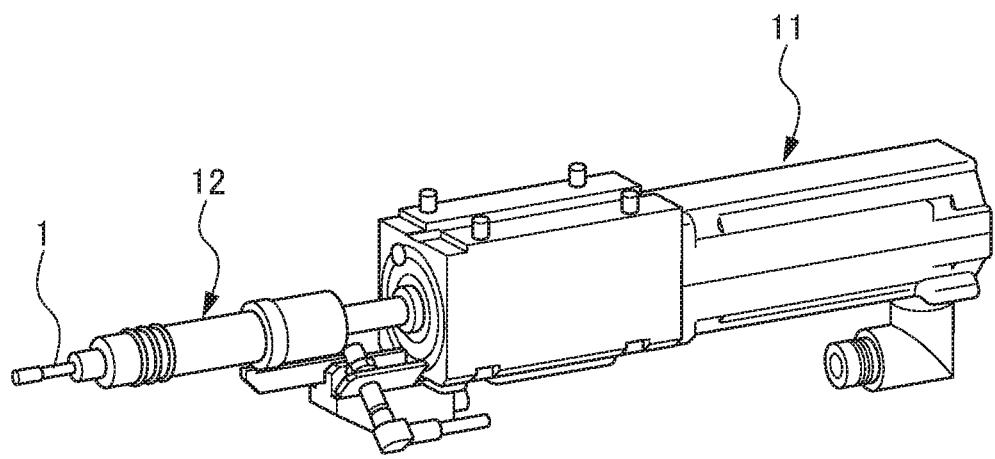
FIG. 2 is a perspective view showing a screw inspection device in the automatic screw inspection system according to the embodiment of the present invention.
Figure 3:
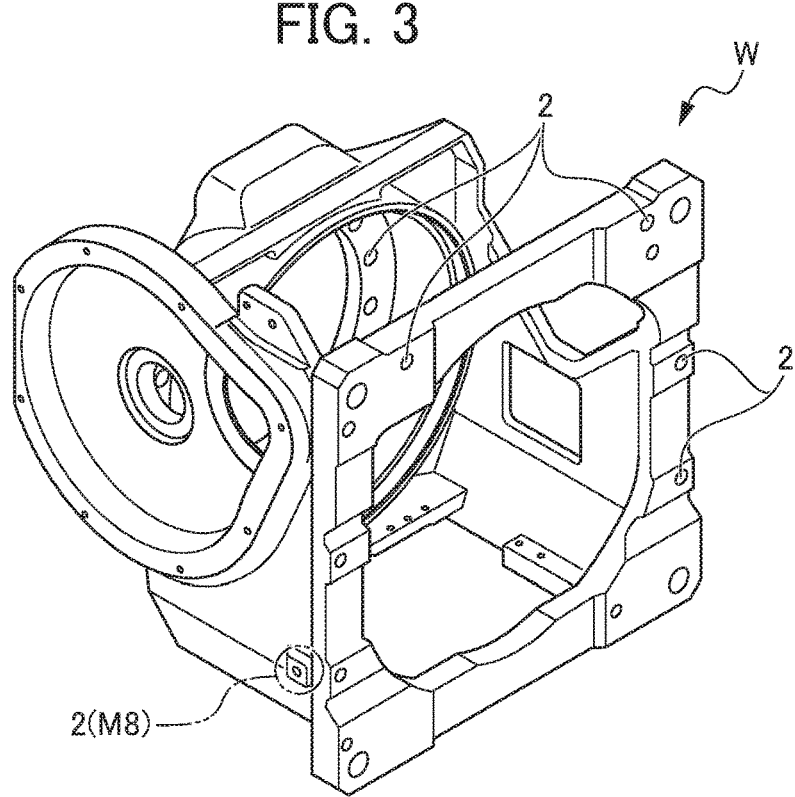
FIG. 3 shows an example of a workpiece as an inspection target.
Figure 4:
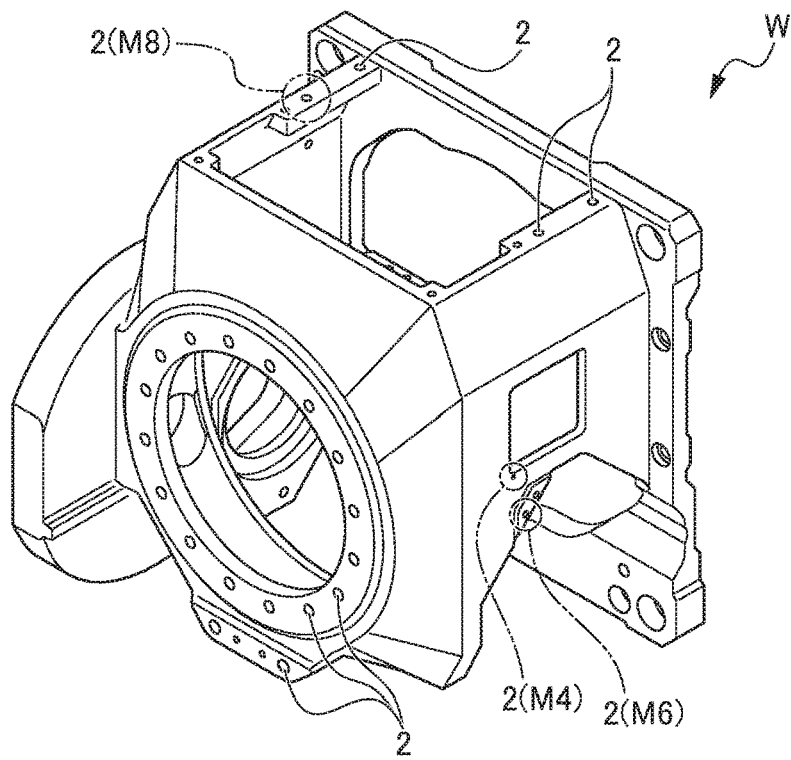
FIG. 4 shows an example of a workpiece as an inspection target.

As shown in FIGS. 2, 3, and 4, the screw inspection device 11 includes a holder unit 12 attached in a removable manner and holding an inspection gauge 1 used for inspection of a female screw hole 2 formed in the workpiece W as an inspection target. As shown in FIG. 1, a gauge storage 13 stores a plurality of holder units 12 while these holder units 12 hold corresponding ones of a plurality of inspection gauges 1 conforming to different inspection gauge standards used for inspection of female screw holes 2 of a plurality of standards. The screw inspection robot 9 is driven to allow the selection of the holder unit 12 from the gauge storage 13, change of the holder unit 12 between the gauge storage 13, and storage of the holder unit 12 into the gauge storage 13. For example, the gauge storage 13 stores 16 holder units 12 holding corresponding inspection gauges 1 of gauge sizes from M3 to M16 (one gauge for go inspection and one gauge for no-go inspection of each size).

The screw inspection device 11 is configured to grasp an amount of forward movement of the inspection gauge 1 using a proximity sensor during inspection, thereby allowing inspection of the female screw hole 2 for pass-fail.

Alternatively, the screw inspection device 11 is configured to allow implementation of inspection as follows. By using a go gauge 1a as the inspection gauge 1, predetermined power (torque) corresponding to the power of screwing in the go gauge 1a by hand without excessive force is set, and a check is performed to see whether the go gauge 1a reaches a designated depth in the female screw hole 2 in response to an application of this power. Further, by using a no-go gauge 1b as the inspection gauge 1, the no-go gauge 1b is screwed into the female screw hole 2 by the application of predetermined power (torque) corresponding to the power of screwing in the no-go gauge 1b by hand without excessive force, and a check is performed to see whether screwing-in of the no-go gauge 1b stops at an amount corresponding to a rotation of less than two turns. In this case, parameters (an amount of forward movement, torque, the number of rotations, etc.) are set in advance for each screw size.

The automatic screw inspection system A of this embodiment includes a controller 15 that controls the drive of the handling robot 8, the screw inspection robot 9, the appearance inspection robot 10, the screw inspection device 11, and the like.

The controller 15 includes: a holder unit attachment/storage control unit 16 that controls the drive of the robots 8 and 9 and the screw inspection device 11 so as to select the holder unit 12 conforming to a standard for the female screw hole 2 formed in an inspection target and to be subjected to inspection from the gauge storage 13 and attach the selected holder unit 12 automatically to the screw inspection device 11 and/or to store the holder unit 12 attached to the screw inspection device 11 in a predetermined position in the gauge storage 13; an inspection implementation control unit 17 that controls the drive of the robot 9 and the screw inspection device 11 so as to make the screw inspection device 11 inspect the female screw hole 2 in the workpiece W as an inspection target on the table 3, 4, or 7 or in the workpiece W retrieved from the table 3, 4, or 7 and held by the robot 8 or 9; a screw hole determination unit 18 that determines the pass-fail of the female screw hole 2 from a result of the screw inspection acquired by drive control by the inspection implementation control unit 17; and a storage unit 19 that stores various types of data.

In the automatic screw inspection system A of this embodiment, the controller 15 executes the following automatic control.

First, a PLC belonging to the system sends an inquiry to a higher-order PC belonging to the uninspected part distribution warehouse (automated warehouse) about the presence or absence of the workpiece W available for inspection. If there is an available workpiece W, a robot program number for this workpiece is acquired from the higher-order PC. The workpiece W and an inspection jig for this workpiece W are both put into a transfer device (truck or load-receiving table), and the workpiece W and the inspection jig are transferred into the screw inspection region R.

Figure 5:
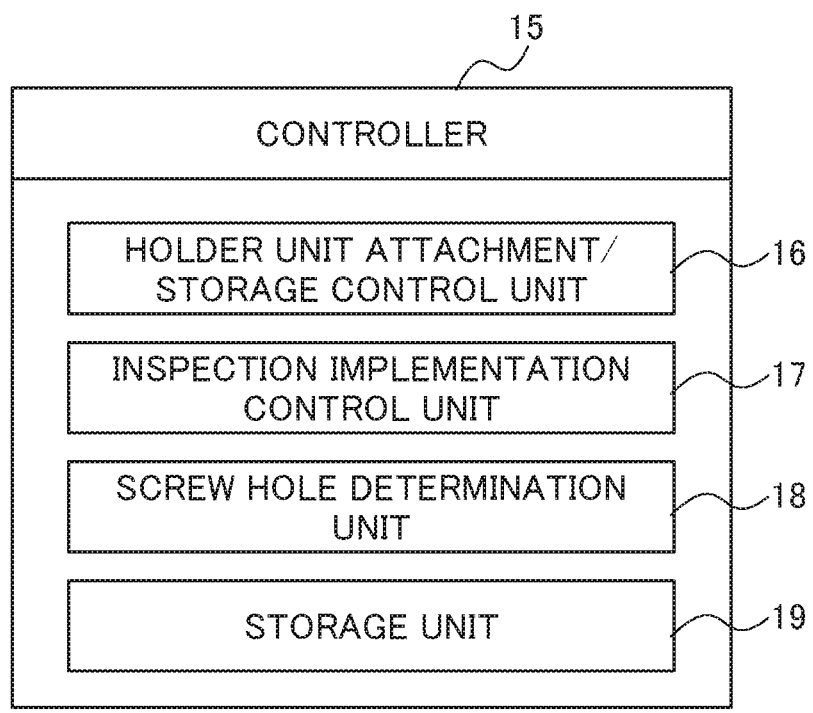
FIG. 5 is a block diagram showing a controller for the automatic screw inspection system according to the embodiment of the present invention.

As shown in FIGS. 1 and 5, the holder unit attachment/storage control unit 16 controls the drive of the screw inspection robot 9 to select the holder unit 12 conforming to a standard for the female screw hole 2 formed in the workpiece W as an inspection target and to be subjected to inspection from the gauge storage 13 and attach the selected holder unit 12 automatically to the screw inspection device 11. The inspection implementation control unit 17 controls the drive of the handling robot 8 and the screw inspection robot 9 to transfer the workpiece W onto the inspection table 7 and make the screw inspection device 11 inspect the female screw hole 2 in the workpiece W. Data about this inspection is stored in the storage unit 19. The screw hole determination unit 18 determines the pass-fail of the female screw hole 2 from the data about the inspection (screw inspection result).

Figure 6:
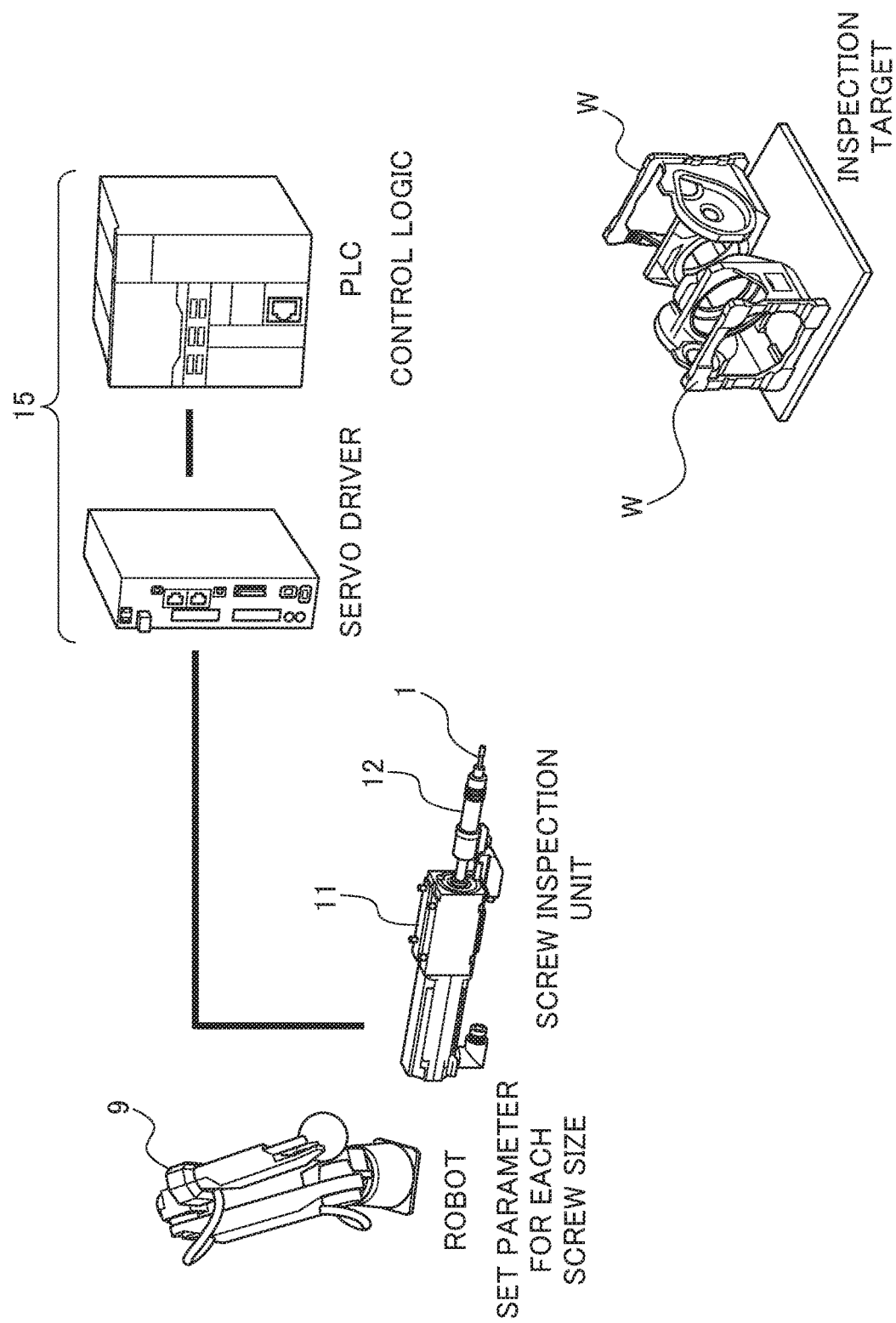
FIG. 6 shows the automatic screw inspection system according to the embodiment of the present invention.

As shown in FIG. 6 (FIGS. 3 and 5), for example, in this embodiment, a check is performed to see whether a plurality of female screw holes 2 are formed in the workpiece W using the same tool on the basis of machining information data acquired in advance. If the female screw holes 2 are formed using the same tool (see (1) in FIG. 7), the inspection implementation control unit 17 exerts control so as to inspect only a female screw hole 2 finally formed among the female screw holes 2 formed using the same tool. On the basis of a result of this inspection, the screw hole determination unit 18 determines the pass-fail of the female screw holes 2 formed using the same tool.

Further, according to this embodiment, a check is performed on the basis of the machining information data to see whether a plurality of female screw holes 2 are formed in the workpiece W by exchanging tools conforming to the same standard. If the female screw holes 2 are formed by exchanging tools conforming to the same standard (see (2) and (3) in FIG. 7), the inspection implementation control unit 17 exerts control so as to inspect a female screw hole 2 finally formed using each of the tools conforming to the same standard among the female screw holes 2 formed using each of the tools conforming to the same standard. On the basis of a result of this inspection, the female screw holes 2 formed using each of the tools conforming to the same standard are grouped into one, and the screw hole determination unit 18 determines the pass-fail of the female screw holes 2 in one group.

In the presence of a female screw hole 2 not available for inspection on the inspection table 7 such as a female screw hole 2 on the lower surface of the workpiece W, for example, this female screw hole 2 is subjected to inspection while being gripped by the screw inspection robot 9. Namely, the screw inspection robot 9 may include a workpiece gripping unit.

As shown in FIG. 7, for example, a file of a result of screw hole inspection is generated automatically for each specification of the workpiece W. This file stores a date and time of the inspection, a machine number, a result of the inspection, and a determination about the pass-fail of a workpiece.

As described above, the automatic screw inspection system A of this embodiment includes the robot 9 to which the screw inspection device 11 is attached, the gauge storage 13 storing the holder units 12, the tables 3, 4, and 7 on which the workpiece W as an inspection target is to be placed, and the controller 15 that controls the drive of the robot 9. Thus, as a result of drive control of the robot 9, it becomes possible to select the holder unit 12 conforming to the standard for the female screw hole 2 from the gauge storage 13 and attach the selected holder unit 12 to the screw inspection device 11 automatically or to store the holder unit 12 attached to the screw inspection device 11 in a predetermined position in the gauge storage 13.

Further, the female screw hole 2 in the workpiece W on the table 3, 4, or 7 or in the workpiece W retrieved from the table 3, 4, or 7 and held by the robot 9 can be subjected to inspection by controlling the drive of the robot 9 and the screw inspection device 11.

As a result, the automatic screw inspection system A of this embodiment is allowed to conduct screw inspection automatically and conduct screw inspection of the workpiece W considerably more efficiently compared to conventional inspection.

In the automatic screw inspection system A of this embodiment, if a plurality of female screw holes 2 are formed using the same tool, control is exerted so as to inspect only a female screw hole 2 finally formed among the female screw holes 2 formed using the same tool. This achieves the implementation of more efficient screw inspection of the workpiece W.

In the automatic screw inspection system A of this embodiment, if a plurality of female screw holes are formed by exchanging tools conforming to the same standard, control is exerted so as to inspect only a female screw hole 2 finally formed using each of the tools conforming to the same standard among the female screw holes 2 formed using each of the tools conforming to the same standard. This achieves implementation of highly-reliable screw inspection more efficiently and more effectively.

In the automatic screw inspection system A of this embodiment, the screw inspection device 11 and the controller 15 may be configured to determine the pass-fail of the female screw hole 2 by detecting the torque applied for threadedly engaging the inspection gauge 1 with the female screw hole 2.

Figure 8:
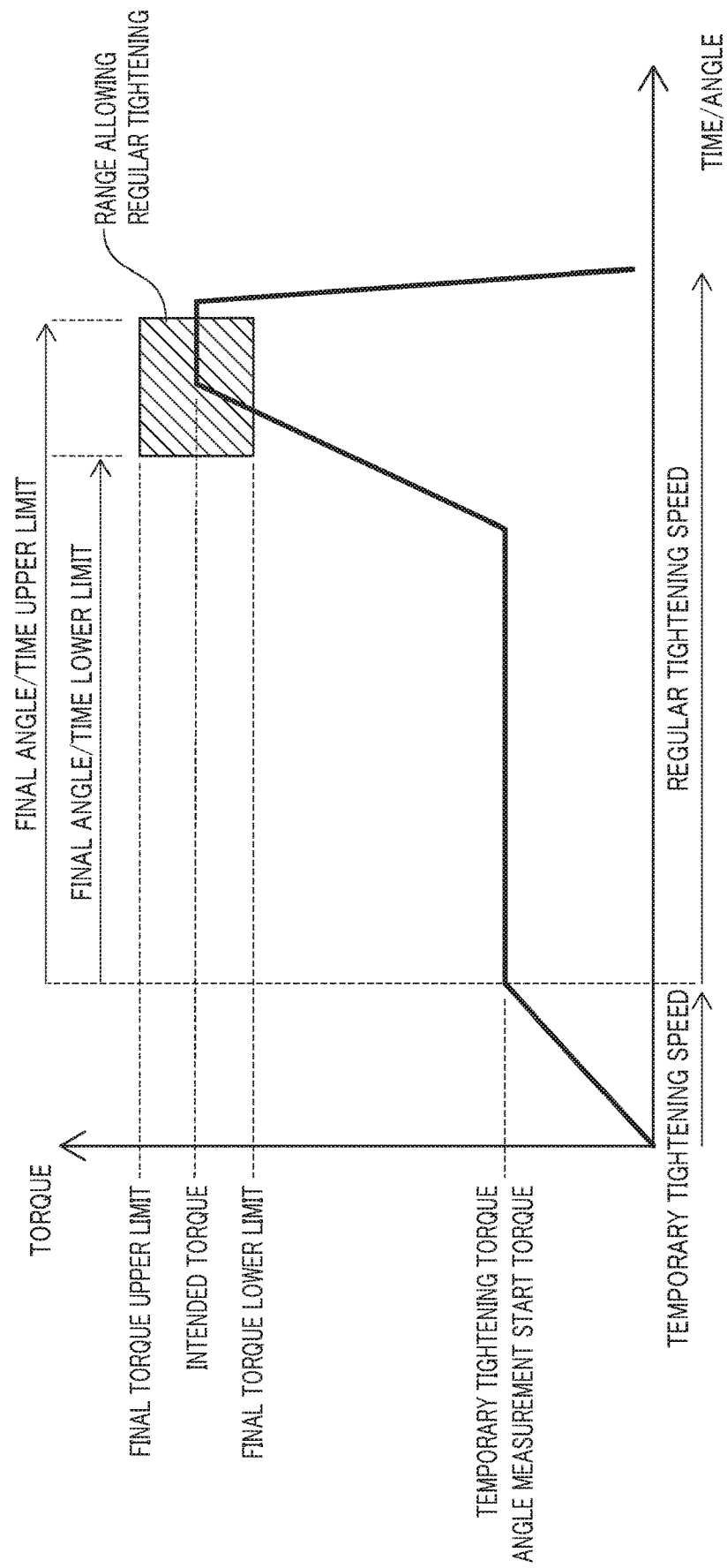
FIG. 8 is a view used for describing how screw inspection is conducted by detecting torque in the automatic screw inspection system according to the embodiment of the present invention.
Figure 9:
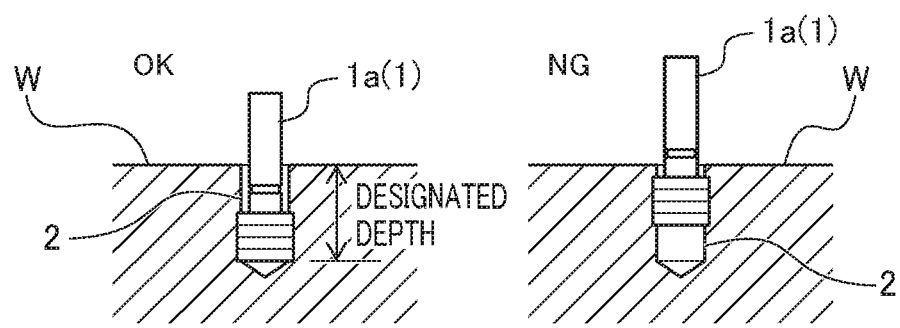
FIG. 9 shows a screw hole inspection using a go gauge.
Figure 10:
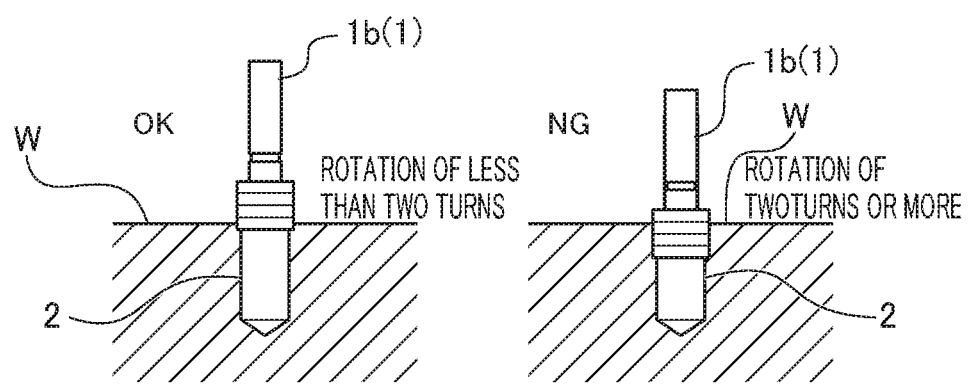
FIG. 10 shows a screw hole inspection using a no-gauge.

In this case, as shown in FIG. 8, intended torque, final torque lower limit (lower limit threshold), and maximum torque upper limit (upper limit threshold) are defined in advance. The torque applied for screw inspection using the screw inspection device 11 is detected. Further, a duration, an angle, temporary tightening speed, and regular tightening speed of the screwing-in of the inspection gauge 1 are detected to check the reach of a predetermined regular tightening range (a range allowing regular tightening), thereby making a determination. In this case, like in the conventional cases, the intended torque to be defined may be predetermined power (torque) corresponding to the power of screwing in the go gauge 1a by hand without excessive force, or may be predetermined power (torque) corresponding to the power of screwing in the no-go gauge 1b by hand without excessive force and stopping the screwing-in of the no-go gauge 1b at an amount corresponding to a rotation of less than two turns. By making the pass-fail of the female screw hole 2 in this way using torque, it becomes possible to conduct highly-reliable screw inspection more efficiently and more effectively.

While one embodiment of the automatic screw inspection system according to the present invention has been described above, the present invention should not be limited to the foregoing one embodiment but can be changed, where appropriate, within a range not deviating from the substance of the invention.

EXPLANATION OF REFERENCE NUMERALS

1 Inspection gauge
1a Go gauge
1b No-go gauge
3 Temporary placement table
4 Temporary placement table
5 Cleaning unit
6 Air blow unit
7 Inspection table
8 Handling robot
9 Screw inspection robot
10 Appearance inspection robot
11 Screw inspection device
12 Holder unit
13 Gauge storage
15 Controller
16 Holder unit attachment/storage control unit
17 Inspection implementation control unit
18 Screw hole determination unit
19 Storage unit
A Automatic screw inspection system
W Inspection target (workpiece)

What is claimed is:

1. An automatic screw inspection system that inspects a female screw hole formed in an inspection target automatically, comprising:
   a robot to which a screw inspection device is attached, the screw inspection device including a holder unit attached in a removable manner and holding an inspection gauge used for inspection of the female screw hole in the inspection target;
   a gauge storage storing a plurality of the holder units for inspection of the female screw hole conforming to a plurality of standards;
   a table on which the inspection target is to be placed; and
   a controller that controls the drive of the robot, wherein the controller comprises:
   a holder unit attachment/storage control unit that controls the drive of the robot and the screw inspection device so as to select the holder unit conforming to a standard for the female screw hole formed in the inspection target and to be subjected to inspection from the gauge storage and attach the selected holder unit automatically to the screw inspection device and/or to store the holder unit attached to the screw inspection device in a predetermined position in the gauge storage; and
   an inspection implementation control unit that controls the drive of the robot and the screw inspection device so as to make the screw inspection device inspect the female screw hole in the inspection target on the table or in the inspection target retrieved from the table and held by the robot;
   wherein, if a plurality of the female screw holes are formed using the same tool, the inspection implementation control unit exerts control so as to inspect only the female screw hole finally formed among the female screw holes formed using the same tool.

2. The automatic screw inspection system according to claim 1, wherein the screw inspection device is configured to determine the pass-fail of the female screw hole by detecting the torque applied for threadedly engaging the inspection gauge with the female screw hole.

3. The automatic screw inspection system according to claim 2, wherein, if a plurality of the female screw holes are formed using the same tool, the inspection implementation control unit exerts control so as to inspect only the female screw hole finally formed among the female screw holes formed using the same tool.

4. The automatic screw inspection system according to claim 1, wherein, if a plurality of the female screw holes are formed by exchanging tools conforming to the same standard, the inspection implementation control unit exerts control so as to inspect the female screw hole finally formed using each of the tools conforming to the same standard among the female screw holes formed using each of the tools conforming to the same standard.

5. The automatic screw inspection system according to claim 3, wherein, if a plurality of the female screw holes are formed by exchanging tools conforming to the same standard, the inspection implementation control unit exerts control so as to inspect the female screw hole finally formed using each of the tools conforming to the same standard among the female screw holes formed using each of the tools conforming to the same standard.

* * * * *